United States Patent [19] [11] 3,974,236
Koga et al. [45] Aug. 10, 1976

[54] PROCESS FOR PRODUCING MODIFIED POLYPROPYLENE

[75] Inventors: Michio Koga; Hideo Sato, both of Yokkaichi, Japan

[73] Assignee: Mitsubishi Petrochemical Company Limited, Japan

[22] Filed: Feb. 18, 1975

[21] Appl. No.: 550,594

[30] Foreign Application Priority Data
Feb. 27, 1974 Japan.............................. 49-22330

[52] U.S. Cl............................................. 260/878 B
[51] Int. Cl.$^2$...................................... C08F 297/08
[58] Field of Search ................................ 260/878 B

[56] References Cited
UNITED STATES PATENTS
3,629,368  12/1971  Fukuda et al. ................. 260/878 B
3,670,053   6/1972  Sennari et al. .................. 260/878 B FOREIGN PATENTS OR APPLICATIONS
20,621  9/1969  Japan ............................. 260/878 B

*Primary Examiner*—Alan Holler
*Attorney, Agent, or Firm*—Robert E. Burns; Emmanuel J. Lobato; Bruce L. Adams

[57] ABSTRACT

Heteroblock copolymers of propylene and ethylene containing a relatively small quantity of an isotactic polypropylene segment, a copolymer segment of very low ethylene (polymerized) content, and another copolymer segment of high ethylene (polymerized) content, in which the quantities of the three types of segments are specific, and in which the isotactic polypropylene content is specific, which heteroblock copolymers are produced by three types of successive steps of polymerization with the monomer feeds in specific ratios of ethylene/propylene, the ratio being zero for the first step.

9 Claims, No Drawings

PROCESS FOR PRODUCING MODIFIED POLYPROPYLENE

BACKGROUND OF THE INVENTION

This invention relates generally to production of modified polypropylenes and more particularly to a process for producing modified polypropylenes or heteroblock copolymers of propylene having desirable characteristics such as excellent surface lustre and high bending rigidity, which are inherent characteristics of isotactic polypropylenes and having, moreover, excellent resistance to impact.

Still more specifically, invention inventio relates to a novel process for producing heteroblock copolymers of propylene which comprises a stage wherein, through the use of a stereospecific catalyst for olefin polymerization, preferably a catalyst comprising (1) a titanium halogen compound and (2) an organoaluminum compound, one cycle or repeated cycles of a combination of polymerization of propylene by itself and copolymerization of a minute quantity of ethylene and propylene are carried out, and a polymer having an ethylene/propylene random copolymer segment containing a minute quantity of ethylene is formed in the polypropylene and a stage wherein an ethylene/propylene mixture of an ethylene concentration above 50 percent by weight is polymerized, and an ethylene/propylene copolymer segment having a high ethylene content is caused to undergo block copolymerization.

While isotactic polypropylenes, in general, are excellent resins having properties such as high rigidity, high resistance to heat, and excellent surface lustre, they have low resistance to impact and are difficult to use in applications where they are subject to mechanical impact or shock (Reference is made to Comparison Example 11).

For this reason, there have heretofore been a number of proposals relating to the improvement of the impact resistance of these polymers. For example, processes such as (1) a process wherein a polyethylene, an ethylene/propylene rubber, or both are mechanically blended and (2) a process wherein propylene and ethylene or another olefin are stepwisely polymerized thereby to form a block copolymer are known. Particularly in relation to the process (2), there is a known process in which block copolymers wherein ethylene/propylene copolymer segments containing ethylene in various concentrations are connected in various proportions are produced by two-stage polymerization or three-stage polymerization.

While the impact resistance of the product is undoubtedly improved by these procedures, surface lustre, which is one of the characteristics of isotactic polypropylene, is lost as a result. Thus, these processes have not been completely satisfactory in all cases for producing modified polypropylene for formed articles of practically balanced quality retaining simultaneously both excellent lustre and high rigidity and, moreover, having excellent impact resistance.

For example, processes for producing modified polypropylene by two-stage polymerizations are disclosed in Japanese Patent Publication Nos. 15535/1964 (U.S. Pat. No. 3,629,368) and 8207/1972 and Patent Laid Open No. 25291/1972. We have tried out these processes, and, as a result, obtained ethylene/propylene copolymers (e.g., Comparison Example - 7 set forth hereinafter) which were not very satisfactory in surface lustre in comparison with polypropylene.

Furthermore, processes comprising three-stage polymerization are disclosed in Japanese Patent Publication Nos. 20621/1969, U.S. Pat. No. 3,670,053 specification, and Japanese Patent Laid Open No. 2578/1973. We have tried out these processes also, and, as a result, obtained ethylene/propylene copolymers (e.g., Comparison Examples 8 and 9 set forth hereinafter) which also were not very satisfactory on the point of surface lustre and impact strength.

Accordingly, since impact-resistant polypropylenes produced by these known processes ordinarily have surface lustres of from 30 to 45, which are far inferior to those of homopolypropylenes, their uses are limited to partial industrial fields such as containers and internal materials for electronic components. Therefore, there has been a need for the development of polypropylenes having excellent impact resistance and surface lustre which can be used as external materials for household goods, parts of electric appliances, and the like particularly requiring good external appearance with surface lustres higher than 55.

SUMMARY OF THE INVENTION

This invention relates to a process for producing new ethylene/propylene block copolymers which comprises the two stages described below, and in which a stereospecific catalyst, particularly a catalyst system comprising a combination of a halogen compound of titanium of a valence lower than the maximum valence, preferably titanium trichloride, and an organo-aluminum compound is used.

In the first stage, Stage I), a step of polymerization of propylene by itself viz. homopolymerization of propylene, and a step of copolymerization of an ethylene/propylene monomer mixture of an ethylene concentration of from 0.2 to 3 percent by weight is successively carried out, the polymerization being so carried out that the first stage is started with the step of homopolymerization, and the step of homopolymerization and the step of copolymerization are each carried out at least once, and the proportion of the quantity of homopolymerization of the propylene does not exceed 25 percent by weight of the total polymerization quantity in this first stage.

In the second stage, Stage II), polymerization is continued with an ethylene/propylene mixture of an ethylene concentration of or of more than 50 percent by weight until the polymerization quantity becomes from 5 to 20 percent by weight of the heteroblock copolymer to be finally produced.

By this process, it is possible to produce, with industrially high productivity modified polypropylenes having excellent surface lustre impact resistance and rigidity.

The nature, utility, and further features of this invention will be apparent from the following detailed description beginning with a consideration of general aspects of the invention and concluding with reference examples and examples constituting preferred embodiments of the invention.

DETAILED DESCRIPTION

The process for producing modified polypropylenes according to this invention comprises carrying out multistage copolymerization of propylene/ethylene by using a catalyst for producing isotactic polypropylenes.

Catalyst

For the catalyst in the process of this invention, it is possible to use a known catalyst for polymerization of olefins such as, for example, a Ziegler-Natta catalyst. However, a particularly suitable catalyst is a combination of an organoaluminum compound with a titanium trichloride composition such as a titanium trichloride composition obtained by reducing titanium tetrachloride with a metal (e.g., aluminum) or an organometal compound (e.g., organoaluminum compound) or a titanium trichloride composition obtained by grinding and activating said composition, and, if desired, a third catalyst component or an agent for improving stereospecificity may be added. An even more preferable catalyst is a combination comprising (1) a modified titanium halide compound prepared by mill processing a mixture of titanium trichloride or a titanium trichloride composition and an electron donor such as, for example, an $\alpha$, $\beta$-unsaturated carboxylic acid ester and (2) an organoaluminum compound.

Examples of suitable organoaluminum compound are aluminum trialkyls and aluminum dialkyl monohalides and sesquihalides, but dialkyl aluminum monohalides, particularly diethylaluminum monochloride, are particularly preferable.

The ratio of the quantities of the titanium compound and the organoaluminum compound, similarly as under the ordinary conditions for producing polypropylene of high crystallinity, is in the, for example, of from 1 : 0.1 to 1 : 100.

Polymerization

1. First Stage

In the presence of the above described catalyst an isotactic polypropylene, partially containing a random copolymer of ethylene and propylene of very small ethylene content is produced.

The polymerization is always started with propylene by itself. It has been found that if ethylene/propylene copolymerization is carried out from the start, lowering of the catalyst activity, increase in the proportion of noncrystalline polymers formed, and other undesirable effects will occur and give rise to a remarkable lowering of the reaction rate of the feed monomers, great impairment of the industrial productivity, and, furthermore, a considerable lowering of the bending strength of the product cf. (Example 3 vs. Comparison Example 6).

The feeding of éthylene is started after the quantity of polymerization of propylene by itself has reached a predetermined quantity. This ethylene feeding can be accomplished continuously or intermittently by a number of repeated cycles, but it is important to prevent the ethylene concentration of the feed monomers from exceeding 3 percent by weight, preferably from 0.2 to 2.5 percent by weight more preferably 1.5 to 2.5 percent by weight at any instant of time, particularly throughout the first stage.

We have found that if the ethylene concentration is higher than the above stated limit, as in the process (Comparison Example 8) of a prior known technique (Japanese Patent Publication No. 20621/1969) wherein this concentration of ethylene is higher than the above range, it will give rise to an increase in the proportion of noncrystalline polymers formed, an increase in the viscosity of the polymer slurry, and a remarkable lowering of the polymerization activity. Moreover, the product quality will be lowered because of a considerable lowering of the bending strength (Compare Example 1 and Comparison Example 1).

This first stage is continued until a specific quantity of polymer is obtained. The specific quantity in this case is preferably a quantity corresponding to a polymerization proportion of from 80 to 95 percent by weight, preferably from 85 to 95 percent by weight, within the ultimate polymer in order that the ultimate polymer will retain the desirable properties of isotactic polypropylenes, particularly excellent lustre and high rigidity. At least one step of homopolymerization of propylene and at least one step of copolymerization of propylene and a small quantity of ethylene is carried out. Ordinarily, from 1 to 10 cycles of each step are carried out, 1 to 5 cycles being preferable.

Furthermore, if the quantity of polymerization of the propylene by itself in this first stage, that is, the isotactic polypropylene content, exceeds 25 percent by weight of the first-stage polymerization quantity, it would be difficult to obtain sufficient improvement of surface lustre (Compare Example 4 and Comparison Example 2). Accordingly, the objects of this invention cannot be achieved by the processes of the prior art (e.g., Japanese Patent Publication Nos. 20621/1969 (See Comparison Example 8) and U.S. Pat. No. 3,670,053 (See Comparison Example 9), and Japanese Patent Laid Open No. 25781/1973). In the process of this invention, also, an especially pronounced surface lustre effect is obtained only with a quantity of polymerization of propylene by itself of less than 20 percent by weight.

In this connection, the above mentioned content of the isotactic polypropylene segment within the heteroblock copolymer to be produced in the first stage is from 0.1 to 20 percent by weight, particularly from 1 to 16 percent by weight.

2. Second Stage

With the polymer formed in the first stage and active catalyst existing as they are, polymerization is continued with an ethylene/propylene mixture rich in ethylene. It is necessary that the ethylene concentration in the ethylene/propylene mixture in this stage be above 50 percent by weight, preferably from 60 to 90 percent by weight. If the ethylene concentration is below this limit (as in, for example, U.S. Pat. No. 3,670,053), the strength of the product will not be sufficiently improved and a product of good flexural strength, and impact strength cannot be obtained cf. Example 3 vs. Comparison Example 3).

The polymerization proportion in this second stage is preferably from 5 to 20 percent by weight, particularly from 5 to 15 percent by weight, with respect to the final heteroblock copolymer. If this proportion is less the above stated range, the product will be deficient in impact resistance (Example 3 vs. Comparison Example 4). On the other hand, if it is greater, surface lustre and flexural strength will be impaired (Example 5 vs. Comparison Example 5).

Polymers of highly desirable characteristics which are objects of this invention are produced only when the specific polymerization conditions in the various steps are satisfied as described above. Since these polymers possess excellent properties of product quality, the scope of their uses is further broadened beyond that of known heteroblock copolymers of propylene, and new fields of use are thereby opened up for development. Thus, these polymers are highly useful in an industrial and commercial sense.

3. Polymerization mode and polymerization conditions.

Any polymerization mode and polymerization conditions which can be applied to polymerization of propylene by itself and to copolymerization of propylene with ethylene can be used.

Accordingly, the monomers are caused to contact the aforedescribed catalyst, in the above described stages and steps, in the presence or absence of a polymerization solvent such as, for example, an aliphatic hydrocarbon (e.g., pentane, hexane, or heptane), an alicyclic hydrocarbon (e.g., cyclohexane or cycloheptane), an aromatic hydrocarbon (e.g., benzene, toluene, or xylene), or a halohydrocarbon (e.g., chlorobenzene or chloronaphthalene), at a temperature of from 0° to 100°C, preferably from 40° to 80°C, and under a pressure of 45 kg/cm² gage, preferably at a pressure not exceeding 35 kg/cm² gage. Depending on the necessity, an agent for adjusting molecular weight, such as hydrogen, can be added for the purpose of adjusting the flow characteristics of the product polymer.

In order to indicate more fully the nature and utility of this invention, the following examples of practice of this invention and comparison examples are set forth, it being understood that the examples are presented as illustrative only and that they are not intended to limit the scope of the invention.

EXAMPLE 1

An autoclave having an internal capacity of 100 liters and provided with an agitator was charged with 40 g. of titanium trichloride, 80 g. of diethylaluminum monochloride, and 45 liters of heptane.

In the first stage, propylene was first fed at a rate of 4 kg/hour into the autoclave, and the polymerization was carried out at 60°C until the polymer quantity amounted to 1 kg. as the first step. Next, as the second step, propylene and ethylene were fed respectively at rates of 4 kg/hour and 0.1 kg/hour into the autoclave, and the polymerization was thus carried out at 60°C until the further polymer quantity amounted to 5.1 kg. These two steps were taken to constitute one cycle, and three of these cycles were successively carried out. The proportion of the ethylene in the feed monomer mixture of this first stage was 2.4 percent by weight.

Upon completion of the above described first stage, unreacted monomers were purged, and, successively, the second stage was carried out by feeding an ethylene/propylene mixture of an ethylene concentration of 80 percent by weight at a rate of 2 kg/hour into the autoclave and continuing polymerization at 60°C until the further polymer quantity amounted to 1.0 kg.

Upon completion of the polymerization, any unreacted monomers were purged, and the polymerization was stopped by adding alcohol. Solvent separation and drying were then carried out, whereupon a copolymer in the form of a white powder was obtained.

Properties of this copolymer are set forth in Table 1.

EXAMPLE 2

1. Preparation of modified titanium halogen compound.

Titanium trichloride available on the market was added in a nitrogen atmosphere into a small vibration mill of an internal capacity of 0.6 liter, and steel balls, each of 15-mm. diameter, were introduced in the vibration mill until they occupied ⅔ of the capacity thereof. Methyl methacrylate in a quantity of 10 percent by weight with respect to the titanium trichloride was added into the mill by metering with a hyperdermic syringe.

Thereafter, the process materials were subjected to a mixing-milling process at room temperature for 10 hours.

2. Copolymerization 40 g. of the modified titanium halogen compound thus prepared, 80 g. of diethylaluminum monochloride, and 45 liters of heptane were charged into an autoclave having an internal capacity of 100 liters and provided with an agitator.

In the first stage, as a first step, propylene was fed at a rate of 4 kg/hour into the autoclave, and the polymerization was thus carried out at 60°C until the polymer quantity amounted to 0.7 kg. Next, as a second step, propylene and ethylene were fed respectively at rates of 4 kg/hour and 0.08 kg/hour into the autoclave, and the polymerization was thus carried out at 60°C until the further polymer quantity amounted to 5.4 kg. These two steps were taken to constitute one cycle, and three of these cycles were successively carried out. Thereafter, unreacted monomers were purged. The proportion of the ethylene in the feed monomer mixture of this first stage was 2.0 percent by weight.

In the succeeding second stage, an ethylene/propylene mixture of an ethylene concentration with 70 percent by weight was fed at a rate of 2 kg/hour into the autoclave, and the polymerization was thus carried out at 60°C until the further polymer quantity amounted to 1.3 kg.

Upon completion of the polymerization, unreacted monomers were purged, and alcohol was added to stop the polymerization. The solvent was separated, and resulting solid was dried, whereupon a copolymer in the form of a white powder was obtained.

Properties of this copolymer are set forth in Table 1.

EXAMPLE 3

40 g. of modified titanium halogen compound prepared in the same manner as in Example 2, 80 g. of diethylaluminum monochloride, and 45 liters of heptane were charged into an autoclave having an internal capacity of 100 liters and provided with an agitator.

In the first stage, propylene was first fed at a rate of 4 kg/hour into the autoclave, and the polymerization was thus carried out at 60°C until the polymer quantity amounted to 4 kg. Then, without changing the rate of feed of the propylene, ethylene was additionally fed at a rate of 0.11 kg/hour into the autoclave, and the polymerization was thus continued at 60°C until the further polymer quantity amounted to 14.3 kg. Thereafter, unreacted monomers were purged. The concentration of the ethylene of the fed monomer mixture of this first stage was 2.7 percent by weight.

In the succeeding second stage, an ethylene/propylene mixture with an ethylene concentration of 65 percent by weight was fed at a rate of 2 kg/hour, and the polymerization was thus carried out at 60°C until the further polymer quantity amounted to 1.8 kg.

Upon completion of the polymerization, unreacted monomers were purged, and alcohol was added to stop the polymerization. The solvent was separated, and the resulting solid was dried, whereupon a copolymer in the form of a white powder was obtained.

Properties of this copolymer are set forth in Table 1.

EXAMPLE 4

40 g. of titanium trichloride, 80 g. of diethylaluminum monochloride, and 45 liters of heptane were charged into an autoclave having a 100-liter internal capacity and provided with an agitator.

In the first stage, as a first step, propylene was first fed into the autoclave at a rate of 4 kg/hour, and the polymerization was carried out at 60°C until the polymer quantity amounted to 0.7 kg. Next, as a second step, propylene and ethylene were fed respectively at rates of 4 kg/hour and 0.07 kg/hour into the autoclave, and the polymerization was thus carried out at 60°C until the further polymer quantity amounted to 4.8 kg. These two steps were taken to constitute one cycle, and three of these cycles were successively carried out. The proportion of the ethylene in the feed monomer mixture of the first stage was 1.8 percent by weight.

Upon completion of the above described first stage, unreacted monomers were purged, and in the succeeding second stage, an ethylene/propylene mixture of an ethylene concentration of 75 percent by weight was fed at a rate of 2 kg/hour into the autoclave, and the polymerization was continued at 60°C until the further polymer quantity amounted to 1.5 kg.

Upon completion of this polymerization, unreacted monomers were purged, and alcohol was added to the process system to stop the polymerization. The solvent was separated out, and the solid product was dried, whereupon a copolymer in the form of a white powder was obtained.

Properties of this copolymer are set forth in Table 1.

EXAMPLE 5

40 g. of titanium trichloride, 80 g. of diethylaluminum monochloride, and 45 liters of heptane were charged into an autoclave having a 100-liter internal capacity and provided with an agitator.

In the first stage, as a first step, propylene was first fed at a rate of 4 kg/hour into the autoclave, and the polymerization was carried out at 60°C until the polymer quantity amounted 0.5 kg. Next, as a second step, propylene and ethylene were fed respectively at rates of 4 kg/hour and 0.08 kg/hour into the autoclave, and the polymerization was thus carried out at 60°C until the further polymer quantity amounted to 4.5 kg. These two steps were taken to constitute one cycle, and three of these cycles were successively carried out. The proportion of the ethylene in the feed monomer mixture of the first stage was 2.4 percent by weight.

Upon completion of the first stage, unreacted monomers were purged, and in the succeeding second stage, an ethylene/propylene mixture of an ethylene concentration of 60 percent by weight was fed at a rate of 2 kg/hour into the autoclave, and the polymerization was thus carried out at 60°C until the further polymer quantity amounted to 2.6 kg.

Upon completion of this polymerization, unreacted monomers were purged, and alcohol was added to the process system to stop the polymerization. Separation of solvent and drying were carried out, whereupon a copolymer in the form of a white powder was obtained.

Properties of this copolymer are set forth in Table 1.

Comparison Example 1

(The case where the first-stage ethylene concentration is excessively high.)

The procedure set forth in Example 1 was carried out under the state conditions except for an ethylene feed rate of 0.17 kg/hour in the first stage. The proportion of the ethylene in the feed monomer mixture of the first stage was 4.1 percent by weight.

The impairment of the flexural rigidity of the copolymer thus obtained was very pronounced as is indicated in Table 1.

Comparison Example 2

(The case where the proportion of polymerization of the propylene by itself in the first stage is excessive.)

In the first stage, as a first step, propylene was fed at a rate of 4 kg/hour, and the polymerization was thus carried out at 60°C until the polymer quantity amounted to 2.5 kg. Next, as a second step, without a change in the feeding rate of the propylene, ethylene was fed at a rate of 0.07 kg/hour into the autoclave, and the polymerization was continued at 60°C until the further polymer quantity amounted to 3.0 kg. These two steps were taken as constituting one cycle, and three cycles were carried out. Except for the above described conditions, the procedure specified in Example 4 was carried out under the conditions set forth therein.

The effect of improvement in lustre of the copolymer thus obtained was deficient as is indicated in Table 1.

Comparison Example 3

(The case of excessively low ethylene concentration in the second stage.)

The procedure set forth in Example 3 was carried out under the conditions specified therein except for an ethylene concentration of 30 percent by weight in the ethylene/propylene mixture fed in the second stage.

The degrees of flexural rigidity and impact resistance of the copolymer thus obtained was very low as in indicated in Table 1.

Comparison Example 4

(The case of excessively small polymer quantity in the second stage.)

The procedure set forth in Example 3 was carried out under the conditions specified therein except that the polymerization of the ethylene/propylene mixture in the second stage was carried out until the polymer quantity amounted to 0.6 kg.

The degree of the impact resistance of the copolymer thus obtained was very low as is indicated in Table 1.

Comparison Example 5

(The case of excessive polymer quantity in the second stage.)

The procedure set forth in Example 5 was carried out under conditions specified therein except that the polymerization of the ethylene/propylene mixture in the second stage was carried out until the polymer quantity amounted to 6 kg.

The degree of flexural rigidity of the copolymer thus obtained was very low as is indicated in Table 1. Furthermore, a high lustre could not be obtained.

Comparison Example 6

(The case of no polymerization of propylene by itself in the first stage.)

The procedure of Example 3 was carried out under the condition set forth therein except that, in the first stage, polymerization of propylene by itself was not carried out at all, and ethylene and propylene were fed respectively at feed rates of 0.11 and 4 kg/hour into the autoclave, the polymerization being thus continued at 60°C until the polymer quantity amounted to 14.3 kg.

The degree of flexural rigidity of the copolymer thus obtained was very low as is indicated in Table 1.

Comparison Example 7

(The case of polymerization process similar to U.S. Pat. No. 3,629,368.)

An autoclave provided with an agitator and having an internal capacity of 100 liters was charged with 40 grams (g.) of titanium trichloride, 80 g. of diethylaluminum monochloride, and 45 liters of heptane.

First, propylene was fed at a rate of 4 kg/hour into the autoclave, and the polymerization was thus carried out at 60°C until the propylene polymerization quantity amounted 18 kg.

Then, after unreacted monomers had been purged, ethylene was fed into the autoclave at a rate of 2 kg/hour, and the polymerization was thus carried out at 60°C until the ethylene polymerization quantity amounted to 2.5 kg.

After completion of the polymerization, the unreacted monomers were purged, and the polymerization was stopped by adding alcohol. The solvent was separated out, and the product was dried, whereupon a copolymer in the form of a white powder was obtained.

Properties of this copolymer are set forth in Table 1.

Comparison Example 8

(The case of polymerization process similar to Japanese Patent Publication No. 20621/1969)

40 g. of titanium trichloride, 80 g. of diethylaluminum monochloride, and 45 liters of heptane were charged into an autoclave of 100-liter internal capacity provided with an agitator.

First, propylene was fed at a rate of 3.5 kg/hour into the autoclave, and the polymerization was thus carried out at 60°C until the propylene polymerization quantity amounted to 18 kg. Successively, an ethylene/propylene mixture of an ethylene concentration of 7 percent by weight was fed at a rate of 3.5 kg/hour into the autoclave, and the polymerization was thus carried out at 60°C until the further polymer quantity amounted to 1.5 kg.

Then, after unreacted monomers had been purged, an ethylene/propylene mixture with an ethylene concentration of 80 percent by weight was fed at a rate of 2.0 kg/hour into the autoclave, and the polymerization was thus carried out at 60°C until the further polymer quantity amounted to 2.5 kg.

Upon completion of the polymerization, unreacted monomers were purged, and the polymerization was stopped by adding alcohol. Separation of the solvent and drying were carried out, whereupon a copolymer in the form of a white powder was obtained.

Properties of this copolymer are at forth in Table 1.

Comparison Example 9

(The case of polymerization process similar to U.S. Pat. No. 3,670,053)

An autoclave having an internal capacity of 100 liters and provided with an agitator was charged with 40 g. of titanium trichloride, 80 g. of diethylaluminum monochloride, and 45 liters of heptane.

First, propylene was fed at a rate of 4 kg/hour into the autoclave, and the polymerization was thus carried out at 60°C until the polymerization quantity amounted to 9.5 kg. Successively, an ethylene/propylene mixture of an ethylene concentration of 1.5 percent by weight was fed at a rate of 4 kg/hour into the autoclave, and the polymerization was thus carried out at 60°C until the further polymer quantity amounted to 6 kg.

Then, after unreacted monomers had been purged, an ethylene/propylene mixture with an ethylene concentration of 35 percent by weight was fed at a rate of 2.0 kg/hour into the autoclave, and the polymerization was thus carried out at 60°C until the further polymer quantity amounted to 4.5 kg.

Upon completion of the polymerization, unreacted monomers were purged, and the polymerization was stopped by adding alcohol. The solvent was separated and the resulting solid was dried, whereupon a copolymer in the form of a white powder was obtained.

Properties of this copolymer are set forth in Table 1.

Comparison Example 10

(The case of polymerization process similar to U.S. Pat. No. 3,670,053)

An autoclave having an internal capacity of 100 liters and provided with an agitator was charged with 40 g. of titanium trichloride, 80 g. of diethylaluminum monochloride, and 45 liters of heptane.

First, propylene was fed into the autoclave, and the polymerization was carried out at 60°C until the polymer quantity amounted to 18 kg. An ethylene/propylene mixture of an ethylene concentration of 1.7 percent by weight was fed into the autoclave, and the polymerization was carried out 60°C until the further polymer quantity amounted to 1.5 kg.

Then, after unreacted monomers had been purged, an ethylene/propylene mixture with an ethylene concentration of 80 percent by weight was fed into the autoclave, and the polymerization was carried out at 60°C until the further polymer quantity amounted to 2.5 kg.

Upon completion of the polymerization, unreacted monomers were purged, and the polymerization was stopped by adding alcohol. By separating the solvent and drying the resulting solid, a copolymer in the form of a white powder was obtained.

Properties of this copolymer are set forth in Table 1.

Comparison Example 11

(The case of homopolypropylene)

40 g. of titanium trichloride, 80 g. of diethylaluminum monochloride, and 45 liters of heptane were charged into an autoclave having a 100-liter internal capacity and having an agitator.

Next propylene was fed at a rate of 4 kg/hour into the autoclave, and the polymerization was thus carried out at 60°C until the polymer quantity amounted to 20 kg.

Upon completion of this polymerization, unreacted monomers were purged, and alcohol was added to stop the polymerization. Solvent separation and drying were carried out, whereupon a homopolypropylene in the form of a white powder was obtained.

Properties of this homopolypropylene are set forth in Table 1.

Table 1

| Group | POLYMERIZATION CONDITIONS | | | | | | PHYSICAL PROPERTIES | | | | |
|---|---|---|---|---|---|---|---|---|---|---|---|
| | 1st Stage | | | | 2nd Stage | | | | | | |
| | 1st Step | | 2nd Step | | | | | | | | |
| | $C_2H_4$ content | Homo-polymer qty. | $C_2H_4$ content | Copo-lymer Qty. | $C_2H_4$ content | Copo-lymer qty. | M I | $C_2H_4$ content | Surface lustre | Impact strength | Flexural rigidity |
| Group 1 | | | | | | | | | | | |
| Example 1 | 0 | 16 | 2.4 | 84 | 80 | 5.2 | 1.7 | 3 | 64 | 11 | 8,200 |
| Comparison Example 1 | 0 | 16 | 4.1 | 84 | 80 | 5.2 | 2.0 | 3 | 63 | 11 | 5,500 |
| Group 2 | | | | | | | | | | | |
| Example 2 | 0 | 11 | 2.0 | 89 | 70 | 6.6 | 1.9 | 4 | 63 | 10 | 8,800 |
| Group 3 | | | | | | | | | | | |
| Example 3 | 0 | 22 | 2.7 | 78 | 65 | 9 | 1.5 | 4 | 61 | 13 | 8,600 |
| Comparison Example 3 | 0 | 22 | 2.7 | 78 | 30 | 9 | 1.6 | 2 | 62 | 6 | 5,800 |
| Comparison Example 4 | 0 | 22 | 2.7 | 78 | 65 | 3.2 | 1.6 | 2 | 64 | 5 | 8,900 |
| Comparison Example 6 | 0 | 0 | 2.7 | 100 | 65 | 11 | 1.7 | 4 | 58 | 12 | 5,200 |
| Group 4 | | | | | | | | | | | |
| Example 4 | 0 | 13 | 1.8 | 87 | 75 | 8.3 | 1.7 | 4 | 63 | 11 | 8,900 |
| Comparison Example 2 | 0 | 45 | 1.8 | 55 | 75 | 8.3 | 1.6 | 4 | 42 | 9 | 8,800 |
| Group 5 | | | | | | | | | | | |
| Example 5 | 0 | 10 | 2.4 | 90 | 60 | 15 | 2.1 | 5 | 58 | 13 | 8,000 |
| Comparison Example 5 | 0 | 10 | 2.4 | 90 | 60 | 29 | 2.3 | 12 | 33 | 16 | 6,000 |
| Group 6 | | | | | | | | | | | |
| Comparison Example 7 | 0 | 100 | 0 | 0 | 100 | 12 | 2.2 | 10 | 32 | 10 | 8,900 |
| Group 7 | | | | | | | | | | | |
| Comparison Example 8 | 0 | 92.3 | 7.0 | 7.7 | 80 | 11 | 2.5 | 8 | 38 | 9.5 | 8,600 |
| Comparison Example 9 | 0 | 61 | 1.5 | 39 | 35 | 23 | 2.3 | 6 | 41 | 9 | 8,200 |
| Comparison Example 10 | 0 | 92.3 | 1.7 | 7.7 | 80 | 11 | 2.0 | 7 | 36 | 8 | 8,800 |
| Group 8 | | | | | | | | | | | |
| Comparison Example 11 | 0 | 100 | 0 | 0 | 0 | 0 | 2.0 | 0 | 65 | 3.5 | 10,500 |

NOTE 1. The physical properties in the above table were measured in accordance with the following standard specifications.
MI (melt index): ASTM D. 1238 57 T
Surface lustre: JIS Z.8741 (20° – 20°)
Charpy impact value: JIS K.7111 (20°C)
Flexural rigidity: ASTM D.747 (10° angle)

2. The polymerization conditions underlined are those outside the present invention.

What is claimed is:

1. A process for producing a heteroblock copolymer of propylene and ethylene which comprises:

First Stage: at least one step of catalytically polymerizing propylene to produce isotactic polypropylene and at least one step of catalytically polymerizing a mixture of ethylene and propylene to produce an ethylene/propylene copolymer, the ethylene content in the mixture being 0.2 to 3% by weight, the content of the isotactic polypropylene being up to 25% by weight of the heteroblock copolymer to be produced in the First Stage, the First Stage being initiated by polymerizing propylene and the both steps being carried out successively;

Second Stage: further catalytically polymerizing a mixture of ethylene and propylene to produce another copolymer of ethylene and propylene, the content of ethylene in the mixture being at least 50% by weight, until the quantity of the copolymer has amounted to 5 to 20% by weight of the heteroblock copolymer to be finally produced.

2. A process as claimed in claim 1 in which each of said steps in said First Stage is carried out from 1 to 10 times.

3. A process as claimed in claim 1 in which each of said steps in said First Stage is carried out from 1 to 5 times.

4. A process as claimed in claim 1 in which said ethylene content in said mixture in said First Stage is 0.2 to 2.5 percent by weight.

5. A process as claimed in claim 1 in which said ethylene content in said mixture in said First Stage is 1.5 to 2.5 percent by weight.

6. A process as claimed in claim 1 in which the content of the isotactic polypropylene segment in the heteroblock copolymer to be produced in the First Stage is 0.1 to 20 percent by weight.

7. A process as claimed in claim 1 in which the content of the isotactic polypropylene segment in the heteroblock copolymer to be produced in the First Stage is 1 to 16 percent by weight.

8. A process as claimed in claim 1 in which said content of ethylene in the mixture in said Second Stage is 60 to 90 percent by weight.

9. A process as claimed in claim 1 in which the quantity of said copolymer in said Second Stage is 5 to 15 percent by weight of the heteroblock copolymer to be finally produced.

* * * * *